(12) United States Patent
Athey et al.

(10) Patent No.: US 9,832,079 B2
(45) Date of Patent: Nov. 28, 2017

(54) DETERMINING THE TOPOLOGY OF A NETWORK

(71) Applicant: Lockheed Martin Corporation, Bethesda, MD (US)

(72) Inventors: Jason E. Athey, Orlando, FL (US); Brennan J. Jones, Orlando, FL (US); Huy D. Truong, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 529 days.

(21) Appl. No.: 14/205,822

(22) Filed: Mar. 12, 2014

(65) Prior Publication Data

US 2014/0280511 A1      Sep. 18, 2014

Related U.S. Application Data (60) Provisional application No. 61/778,945, filed on Mar. 13, 2013.

(51) Int. Cl.
*H04L 12/24* (2006.01)

(52) U.S. Cl.
CPC .................. *H04L 41/12* (2013.01)

(58) Field of Classification Search
CPC ...................................... H04L 41/12
USPC ....................... 709/203, 220, 222
See application file for complete search history.

(56) References Cited

U.S. PATENT DOCUMENTS

| 7,870,246 B1 | 1/2011 | Davis et al. |
| 7,881,230 B2 * | 2/2011 | Vinayagam ............. H04L 49/30 370/255 |
| 8,046,450 B1 * | 10/2011 | Schloss ............... H04L 41/0809 709/220 |

(Continued)

FOREIGN PATENT DOCUMENTS

| EP | 1432182 A1 | 6/2004 |
| EP | 2348674 A1 | 7/2011 |

OTHER PUBLICATIONS

Examination Report for British Patent Application No. 1404455.6, dated Sep. 18, 2014, 6 pages.

(Continued)

*Primary Examiner* — Kevin Bates
*Assistant Examiner* — Chen-Liang Huang
(74) *Attorney, Agent, or Firm* — Withrow & Terranova, PLLC (57) ABSTRACT

Mechanisms for determining a network topology are disclosed. Client computer information messages are received from a plurality of client computers. The client computer information messages include a network identifier that identifies a network address of a respective client computer. A first link table that identifies ports of a first switch device and corresponding network identifiers of at least some client computers is received from the first switch device. A second link table that identifies ports of a second switch device and corresponding network identifiers of other client computers is received from the second switch device. A nodal tree structure is generated that identifies the plurality of client computers, the communication links between the plurality of client computers, the first switch device, and the second switch device based on the client computer information messages, the first link table, and the second link table.

16 Claims, 8 Drawing Sheets

(56) References Cited

U.S. PATENT DOCUMENTS

| | | |
|---|---|---|
| 8,437,277 B2 | 5/2013 | Radulescu et al. |
| 8,578,034 B2 | 11/2013 | Schemitsch |
| 2005/0071442 A1 | 3/2005 | Becker et al. |
| 2007/0115967 A1* | 5/2007 | Vandenberghe ........ H04L 41/12 370/389 |
| 2007/0204231 A1 | 8/2007 | Cunningham et al. |
| 2008/0224838 A1 | 9/2008 | Rains et al. |
| 2010/0145542 A1* | 6/2010 | Chapel ................... G05B 15/02 700/295 |
| 2011/0093703 A1* | 4/2011 | Etchegoyen ............ G06F 21/57 713/168 |
| 2013/0227338 A1* | 8/2013 | Lingafelt ................ H04L 12/28 714/4.5 |
| 2013/0346260 A1* | 12/2013 | Jubran .................. G06F 9/5072 705/28 |
| 2014/0053149 A1* | 2/2014 | Wu .......................... G06F 8/61 717/176 |

OTHER PUBLICATIONS

Examination Report No. 1 for Australian Patent Application No. 2014201468, dated Jan. 13, 2017, 2 pages.

* cited by examiner

DETERMINING THE TOPOLOGY OF A NETWORK

RELATED APPLICATIONS

This application claims the benefit of provisional patent application Ser. No. 61/778,945, filed Mar. 13, 2013, entitled AUTOMATED SYSTEM INFRASTRUCTURE FRAMEWORK, the disclosure of which is hereby incorporated herein by reference in its entirety.

TECHNICAL FIELD

The embodiments relate to networks, and in particular to determining the networked devices and links therebetween in a network.

BACKGROUND

It is often useful or necessary to understand the topology of a network, including what networked devices exist on the network, as well as the links between such networked devices. This information can be determined manually by accessing each of the networked devices and executing appropriate commands on the networked devices to glean the desired information. However, a manual process is time-consuming and fraught with the likelihood of human error, and the network topology may change frequently depending on the environment, leading to the likelihood of a disparity between what is believed to be the network topology and the actual network topology. As a network grows to hundreds or thousands of networked devices, such manual processes become increasingly impractical.

SUMMARY

The embodiments relate to automatically determining the devices in a network, as well as the links between such devices. The devices may comprise, by way of non-limiting for example, switch devices, client computers, power sources, telephones and the like. The links may comprise, for example, communication links between such devices and power links between such devices. The communication links may by wired or wireless.

In one embodiment, a method for obtaining information about a network is provided. A server receives, from a plurality of client computers during a boot process of the respective client computers, a plurality of requests for a service. In one embodiment, the server comprises a Dynamic Host Configuration Protocol (DHCP) server, and the requests comprise requests for Internet Protocol (IP) addresses for use by the respective client computers to facilitate communication over the network.

The server provides a boot image to each client computer. Each boot image includes a discovery module configured to execute on the respective client computer to which the boot image is provided. The server receives client computer information messages from the plurality of client computers. The client computer information messages each include a network identifier that identifies a network address of a respective client computer. In one embodiment, the network identifier is a media access control (MAC) address of an Ethernet port of the respective client computer.

The server receives, from a first switch device, a first link table that identifies ports of the first switch device and corresponding network identifiers of at least some client computers of the plurality client computers. The server receives, from a second switch device, a second link table that identifies ports of the second switch device and corresponding network identifiers of at least other client computers of the plurality client computers.

The server then generates a nodal tree structure that identifies the plurality of client computers, the communication links between the plurality of client computers, the first switch device, and the second switch device based on the client computer information messages, the first link table, and the second link table.

The nodal tree structure may be used for a variety of purposes. For example, the nodal tree structure may be used to generate a visual depiction of the devices in the network and the physical links between such devices for presentation to a user. The nodal tree structure may be used to generate a physical data file that identifies the devices and the physical links in one or more desired formats, including, by way of non-limiting example, an XML format, a JavaScript Object Notation (JSON) format, or the like. The physical data file may, for example, be used by other automated processes for configuration purposes, querying purposes, or the like.

In one embodiment, the server also determines power links between the client computers and power devices. The power devices are capable of network communication. The server sends, to a first power device, a message directing the first power device to halt power to a first socket of the first power device. The server determines that one of the plurality of client computers is no longer capable of communicating. The server identifies that the one of the plurality of client computers is coupled to the first socket of the first power device.

In one embodiment, server determines that one of the plurality of client computers is no longer capable of communicating by attempting to communicate with each client computer of the plurality of client computers. The client computer that does not communicate is the client computer determined to be coupled to the first socket of the first power device.

In one embodiment, for each respective power device of a plurality of power devices, the server sends the respective power device a message directing the respective power device to halt power to a first socket of the respective power device. The server determines that one of the plurality of client computers is no longer capable of communicating, and identifies the one of the plurality of client computers as being coupled to the first socket of the respective power device. In this manner, the nodal tree may include not only physical communication links between the devices of the network, but also physical power links between the client computers and power sources in the network.

Those skilled in the art will appreciate the scope of the disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

Figure 1:
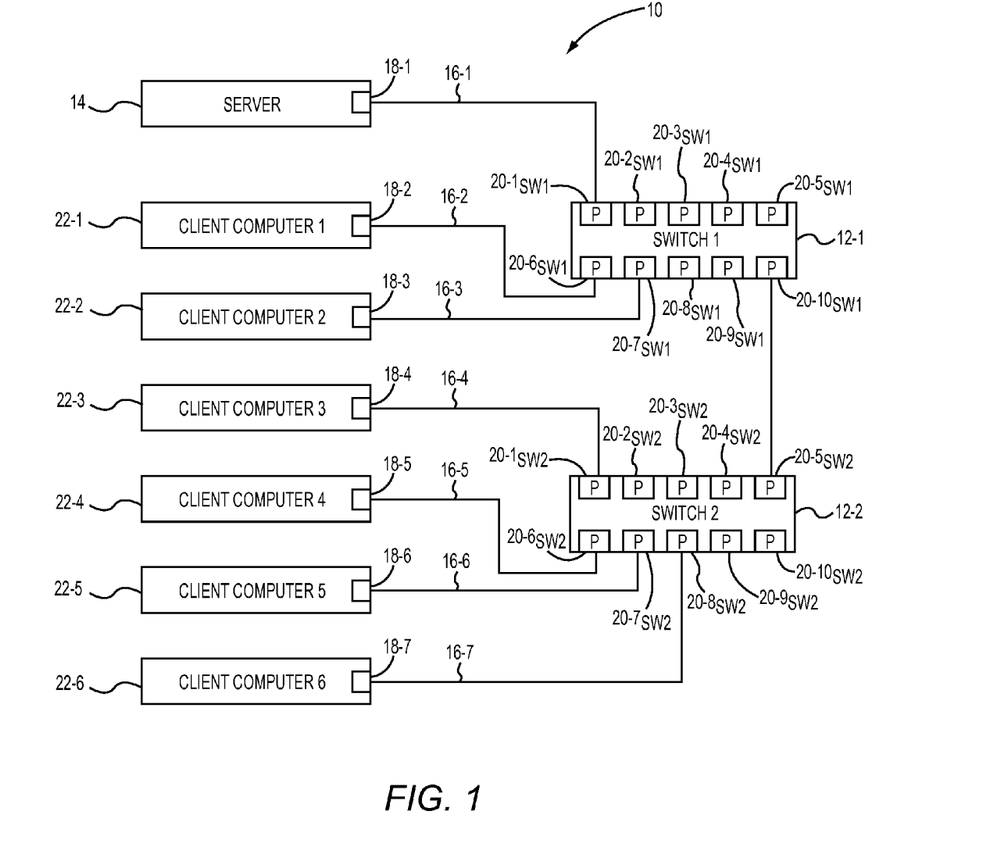
FIG. 1 is a block diagram of an example network in which embodiments may be practiced.

The embodiments relate to networks and, in particular, to determining links between networked devices in a network. Each networked device contains a communication link to at least one other networked device. The communication links may comprise actual copper paths, implemented via a cable or other wire, or, in some embodiments, may be implemented by wireless communication links. FIG. 1 is a block diagram of an example network 10 in which embodiments may be practiced. The network 10 includes one or more switch devices 12-1-12-2 (generally, switch devices 12). The switch devices 12 may comprise any processing device whose functionality includes facilitating communications between two other processing devices. The phrase "processing device" refers generally to a device that includes a processor, a memory, and a communication interface configured to communicate via a network. The switch devices 12, in one embodiment, comprise Ethernet switches, but the embodiments are not limited to any particular type of switch. The network 10 includes a server 14 that is communicatively coupled to the switch device 12-1 via a communication link 16-1. Communication links may be referred to generally herein as communication links 16. The server 14 may comprise any suitable processing device and, in one embodiment, comprises a Dynamic Host Configuration Protocol (DHCP) server configured to return an Internet Protocol for use in inter-device communications on the network 10. The communication link 16-1 couples a communication interface 18-1 of the server 14 with a port $20\text{-}1_{SW1}$ of the switch device 12-1. The communication interface 18-1 and the port $20\text{-}1_{SW1}$ may comprise, for example, Ethernet ports, and the communication link 16-1 may comprise, for example, an Ethernet cable.

The client computers 22-1-22-2 are communicatively coupled to the switch device 12-1 via respective communication links 16-2-16-3, and a plurality of client computers 22-3-22-6 are communicatively coupled to a switch device 12-2 via respective communication links 16-4-16-7. The client computers 22-1-22-6 may be generally referred to herein as client computers 22, and the communication links 16-1-16-7 may be generally referred to herein as communication links 16. A client computer 22 may comprise, by way of non-limiting example, a desktop or laptop computer, a printer, a phone, a computer tablet, or any other device capable of communicating over a communication link with another device in a network.

In one embodiment, each communication link 16 is a physical communication link, and comprises a wire, a cable, such as an Ethernet or fiber cable, or the like that couples a respective communication interface 18 to a port 20 of a respective switch device 12. Specifically, the communication link 16-2 couples a communication interface 18-2 to a port $20\text{-}6_{SW1}$; the communication link 16-3 couples a communication interface 18-3 to a port $20\text{-}7_{SW1}$; the communication link 16-4 couples a communication interface 18-4 to a port $20\text{-}1_{SW2}$; the communication link 16-5 couples a communication interface 18-5 to a port $20\text{-}6_{SW2}$; the communication link 16-6 couples a communication interface 18-6 to a port $20\text{-}7_{SW2}$; and the communication link 16-7 couples a communication interface 18-7 to a port $20\text{-}8_{SW2}$, between the client computers 22 and the switch devices 12.

In one embodiment, as each client computer 22 is initiated, the client computer 22 enters a boot process. During such boot process each client computer 22 is pre-configured to communicate with the server 14 to request a service, such as a service that returns an Internet Protocol (IP) address for use by the respective client computer 22 in inter-device communications on the network 10. In some embodiments, the client computers 22 are configured to utilize a Preboot eXecution Environment (PXE); however, the embodiments are not limited to PXE. Upon receipt of the request for the service from each client computer 22, the server 14 provides the respective client computer 22 with an IP address, and access to a boot image. The mechanism for providing access to the boot image comprises providing the client computer 22 with information that informs the client computer 22 where to locate the boot image, or comprises providing the boot image to the client computer 22.

Each client computer 22 obtains the boot image and loads, or otherwise executes, the boot image. The boot image includes a discovery module that is configured to execute on the respective client computer 22. The discovery module is configured to extract information from the client computer 22, including client computer information that includes a network identifier that identifies a network address of the respective client computer 22. In one embodiment, the network address comprises a media access control (MAC) address of the communication interface 18 associated with the client computer 22.

The discovery module may be configured to obtain a variety of different client computer information about the client computer, including, by way of non-limiting example, network interface information that identifies information associated with a communication interface 18 utilized by the client computer 22, including a MAC address, a vendor of the communication interface 18, a driver version utilized by the communication interface 18, and a model of the communication interface 18. The client computer information may also identify the amount of memory installed on the client computer 22 and identify information about one or more processors utilized by the client computer 22, including, for example, a speed of the processor, a model of the processor, a number of cores of the processor, a current number of threads executing on the processor, an architecture of the processor, and virtualization technology that may be utilized by the processor. The client computer information may also include information about a video card utilized by the client computer 22, including, for example, the vendor of the video card and a model of the video card. The client computer information may also include information about a host bus adapter (HBA) card utilized by the client computer 22, which may include, for example, a port world wide name (WWN) and a node WWN. The client computer information may also include general system information about the client computer 22, including, for example, the vendor who manufactured the client computer 22, a model number of the client computer 22, and a serial number of the client computer 22. Any or all of such information may be stored in a nodal tree structure generated by the server 14.

In one embodiment, the server 14 receives a registration request from each client computer 22 after the boot image has executed on the client computer 22. The server 14 may maintain a table identifying each client computer 22 that has registered. The server 14 sends each client computer 22 a message requesting that the client computer 22 provide the server 14 with client computer information that identifies a network address utilized by the client computer 22. In response, each client computer 22 provides the server 14 with a network identifier that identifies a network address of the respective client computer 22.

The server 14 may also send a message to each switch device 12 requesting that each switch device 12 provide the server 14 with a link table that identifies ports 20 of the respective switch device 12 and corresponding network identifiers of client computers 22 that are coupled to the respective ports 20. The server 14 may determine the existence of the switch devices 12 in any desired manner. In one embodiment, a network operator configures the server 14 with information regarding the switch devices 12, including network addresses, such as IP addresses, of the switch devices 12. In other embodiments, the server 14 may utilize auto-discovery mechanisms for determining the existence of and addresses of the switch devices 12.

The switch device 12-1 returns the link table of the switch device 12-1, which identifies ports 20 of the switch device 12-1 and network addresses, in this example MAC addresses, of devices coupled to the ports 20 of the switch device 12-1, including, for example, the MAC addresses of the server 14 and the client computers 22-1-22-2. Similarly, the switch device 12-2 returns the link table of the switch device 12-2, which identifies ports 20 of the respective switch device 12-2 and network addresses, in this example MAC addresses, of devices coupled to the ports 20 of the switch device 12-2, including, for example, the MAC addresses of the client computers 22-3-22-6.

The server 14 then generates a nodal tree structure that identifies the client computers 22, the communication links 16 between the client computers 22, the switch device 12-1, and the switch device 12-2, based on the client computer information messages received from the client computers 22, the link table received from the switch device 12-1, and the link table received from the switch device 12-2.

The server 14, in some embodiments, may obtain and record additional switch information about each switch device 12. The switch information may include, by way of non-limiting example, a Management IP address used to send management commands to the switch device 12, a Simple Network Management Protocol (SNMP) Community identifier that identifies an SNMP Community with which the respective switch device 12 is associated, a version of the switch device 12, a model number of the switch device 12, a device identifier that identifies the switch device 12, and a firmware version of the switch device 12. The switch information may also include port information for a plurality of ports 20 of the switch device 12, including, for each port 20, a port identifier that identifies the port 20, a card identifier that identifies the card on which the port 20 exists, a stack identifier that identifies a stack associated with the port 20 if the switch device 12 supports stacks, and a MAC address of the communication interface 18 of the client computer 22 that is coupled to the port 20. The switch information may also provide information about neighbor switch devices 12 to which the respective switch device 12 is physically connected, including for example, a Neighbor Device ID that identifies the device identifier of the neighbor switch device 12, and a Neighbor Port Description that identifies the port 20 of the respective switch device 12 that is physically coupled to the neighbor switch device 12.

Any or all of such information may be stored in the nodal tree structure generated by the server 14.

Figure 2:
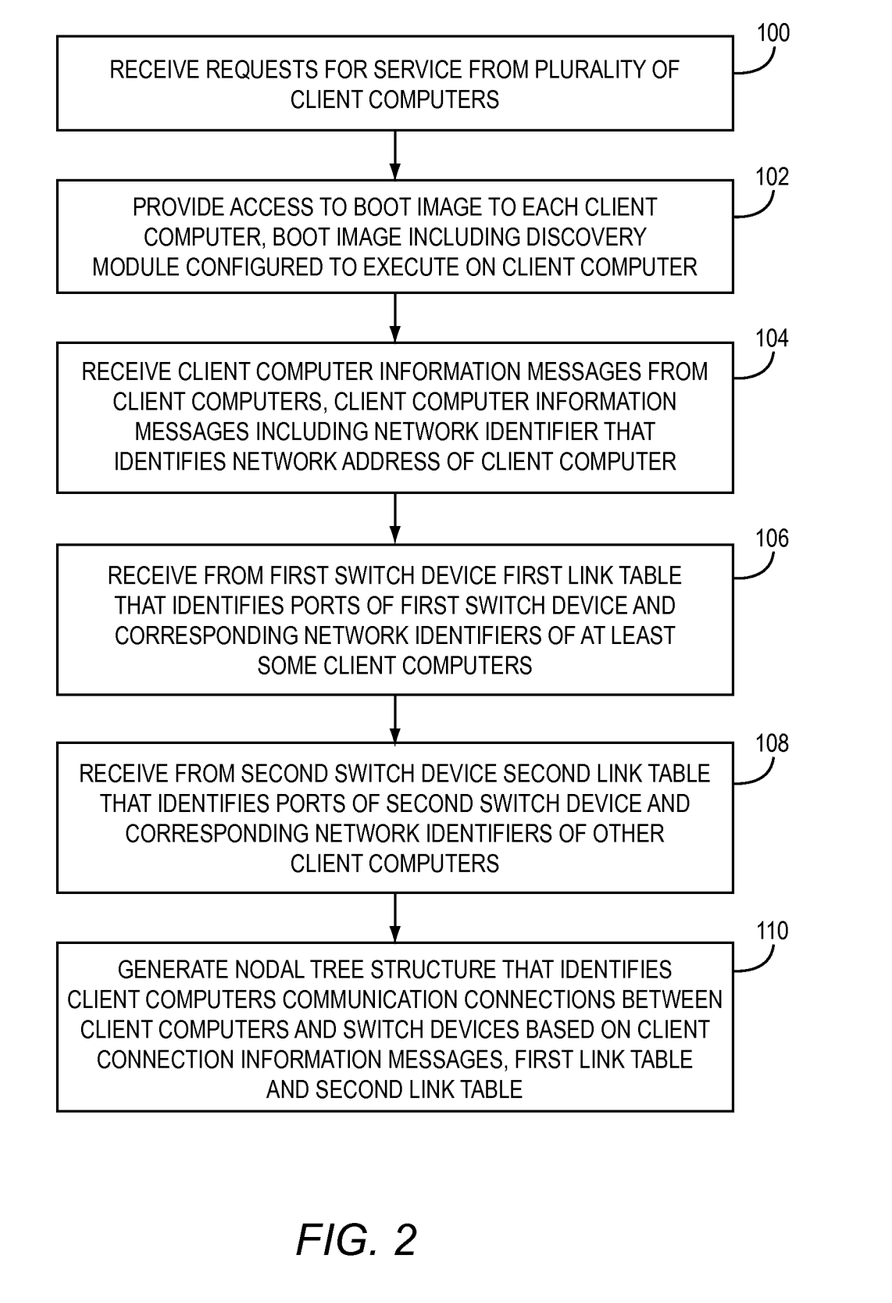
FIG. 2 is a flowchart of a process for obtaining information about the network according to one embodiment.

FIG. 2 is a flowchart of a process for obtaining information about a network according to one embodiment. FIG. 2 will be discussed in conjunction with FIG. 1. Initially, the server 14 receives a plurality of requests for a service from the client computers 22 (FIG. 2, block 100). In response, the server 14 provides access to a respective boot image to each client computer 22. Each respective boot image includes a discovery module that is configured to execute on the client computer 22 to which the respective boot image is provided (FIG. 2, block 102). The server 14 then receives client computer information messages from the client computers 22 that include a network identifier, such as a MAC address, that identifies a network address of a respective client computer 22 (FIG. 2, block 104). The server 14 receives, from the switch device 12-1, a first link table that identifies ports 20 of the switch device 12-1 and corresponding network identifiers of at least some client computers 22 (FIG. 2, block 106). In some embodiments, the server 14 receives the first link table in response to a SNMP message sent from the server 14 to the switch device 12-1. The server 14 receives from the switch device 12-2 a second link table that identifies ports 20 of the switch device 12-2 and corresponding network identifiers of other client computers 22 (FIG. 2, block 108).

The server 14 generates a nodal tree structure that identifies the client computers 22, the communication links between the client computers 22, the switch device 12-1, and the switch device 12-2 based on the client computer information messages, the first link table, and the second link table (FIG. 2, block 110).

Figure 3:
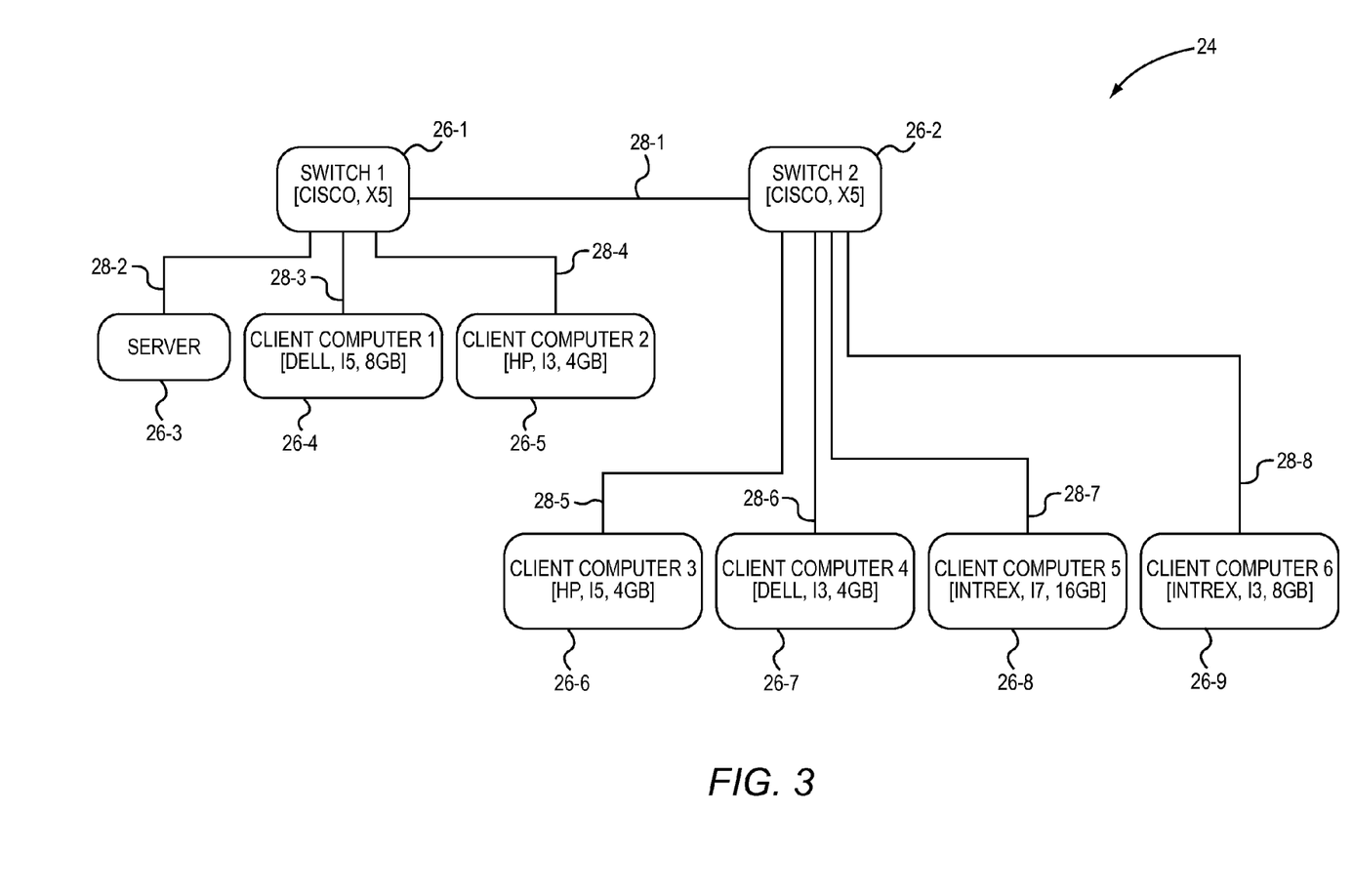
FIG. 3 is a block diagram of a visual representation of a nodal tree structure according to one embodiment.

FIG. 3 is a block diagram of a visual representation 24 of a nodal tree structure that may be presented to a user according to one embodiment. The visual representation 24 depicts a node 26-1 that represents the switch device 12-1, a node 26-2 that represents the switch device 12-2, and a connector 28-1 that indicates a communication link between the switch device 12-1 and the switch device 12-2. The visual representation 24 may also depict some or all of the additional switch information received from such switch devices 12. Nodes 26-3-26-5 and respective connectors 28-2-28-4 indicate that the switch device 12-1 is physically connected to the server 14 and the client computers 22-1 and 22-2. Nodes 26-6-26-9 and respective connectors 28-5-22-8 indicate that the switch device 12-2 is physically connected to the client computers 22-3-22-6. The visual representation 24 may also visually depict some or all of the additional client computer information received from such client computers 22.

Figure 4:
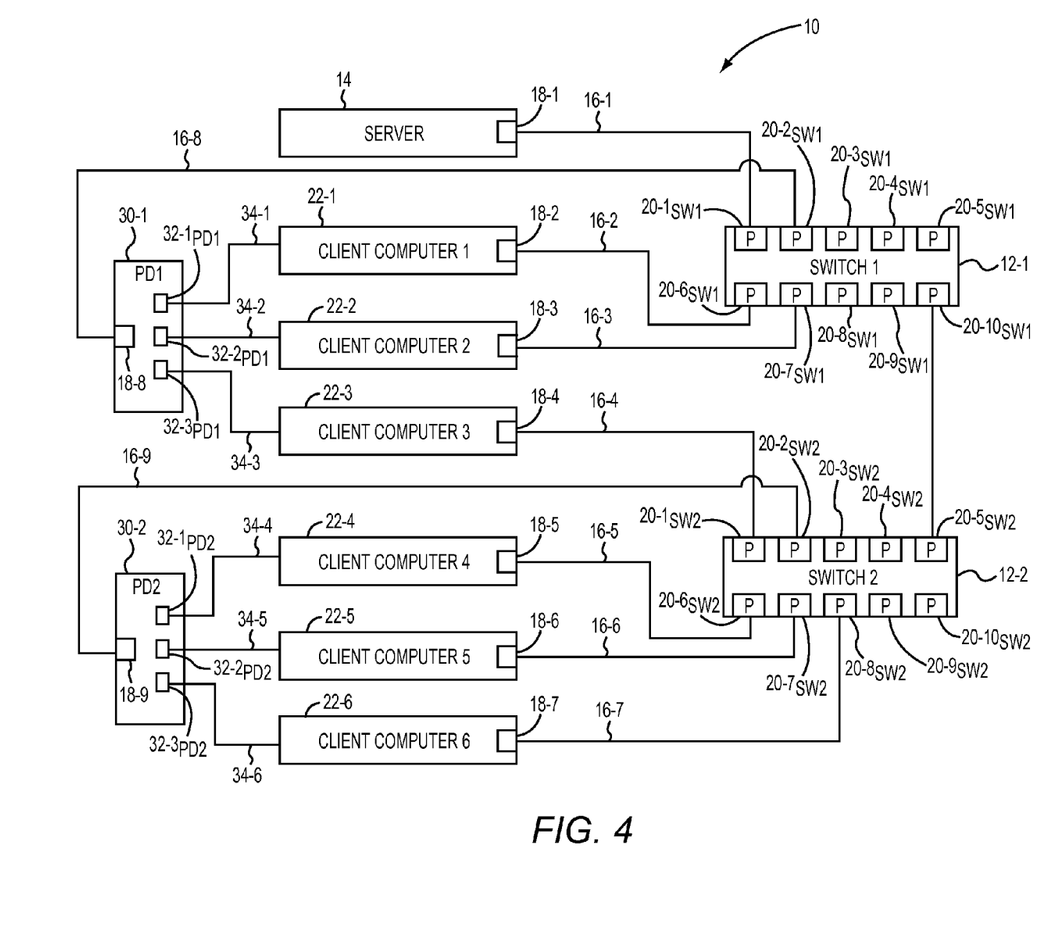
FIG. 4 is a block diagram of the network according to another embodiment.

FIG. 4 is a block diagram of the network 10 according to another embodiment. In this embodiment, the network 10 includes a plurality of power devices 30-1-30-2 (generally, power devices 30). The power device 30-1 contains sockets $32\text{-}1_{PD1}$, $32\text{-}2_{PD1}$, and $32\text{-}3_{PD1}$, and the power device 30-2 contains sockets $32\text{-}1_{PD2}$, $32\text{-}2_{PD2}$, and $32\text{-}3_{PD2}$ (the sockets $32\text{-}1_{PD1}\text{-}32\text{-}3_{pD2}$ may be generally referred herein as sockets 32). The power devices include respective communication interfaces 18-8 and 18-9. The communication interface 18-8 is coupled to the port $20\text{-}2_{SW1}$ of the switch device 12-1, and the communication interface 18-9 is coupled to the port $20\text{-}2_{SW2}$ of the switch device 12-2. The client computer 22-1 draws power from the socket $32\text{-}1_{PD1}$ via a power link 34-1; the client computer 22-2 draws power from the socket $32\text{-}2_{PD1}$ via a power link 34-2; the client computer 22-3 draws power from the socket $32\text{-}3_{PD1}$ via a power link 34-3; the client computer 22-4 draws power from the socket $32\text{-}1_{PD2}$ via a power link 34-4; the client computer 22-5 draws power from the socket $32\text{-}2_{PD2}$ via a power link 34-5; and the client computer 22-6 draws power from the socket $32\text{-}3_{PD2}$ via a power link 34-6.

In one embodiment, the server 14 determines the existence and network addresses of the power devices 30. In one embodiment, a network operator configures the server 14 with information regarding the power devices 30, including network addresses, such as IP addresses, of the power devices 30. In other embodiments, the server 14 may utilize auto-discovery mechanisms for determining the existence of and network addresses of the power devices 30.

The server 14 sends the power device 30-1 a message directing the power device 30-1 to halt power to the socket $32\text{-}1_{PD1}$. The message may comprise, for example, a SNMP message. The power device 30-1 halts the power provided via the socket $32\text{-}1_{PD1}$, which turns off the client computer 22-1. The server 14 then determines that the client computer 22-1 is no longer capable of communicating. This determination may be made, for example, by successively attempting to initiate a communication with each client computer 22. The first client computer 22 that does not respond may be identified in the nodal tree structure by the server 14 as the client computer 22 that is coupled to the socket $32\text{-}1_{PD1}$. This process may be repeated for each socket 32 of each power device 30 to determine which sockets 32 power which client computers 22.

Figure 5:
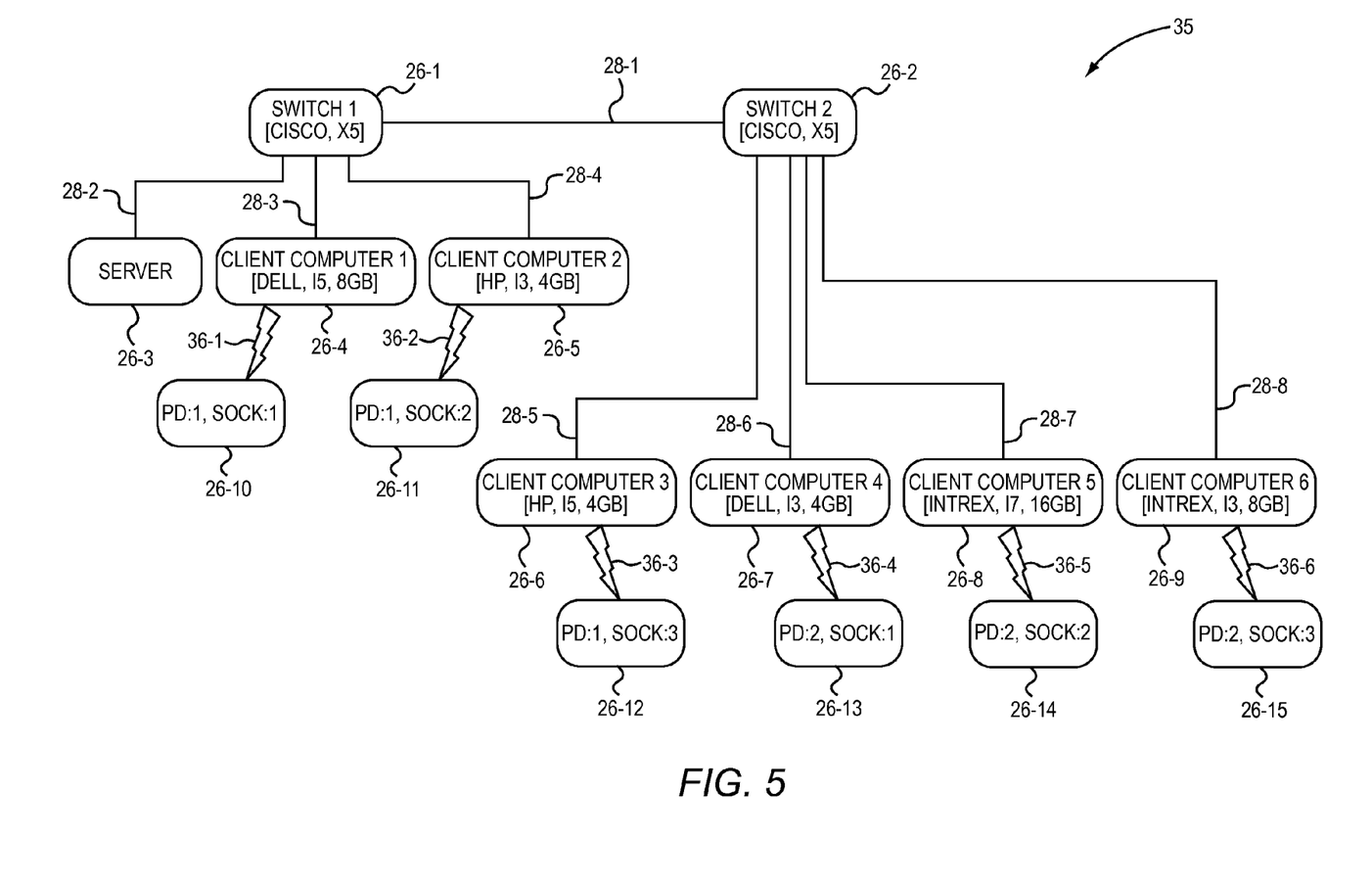
FIG. 5 is a block diagram of a visual representation of a nodal tree structure according to another embodiment.

FIG. 5 is a block diagram of a visual representation 35 of a nodal tree structure according to one embodiment. The visual representation 35 illustrates the communication links 16 between the switch devices 12, the client computers 22, and the server 14, as discussed above with regard to FIG. 3. In this embodiment, the visual representation 35 also identifies the sockets 32 of the power devices 30 as individual nodes 26-10-26-15. A power connector 36-1 visually depicts that the client computer 22-1 is coupled to socket $32\text{-}1_{PD1}$ of the power device 30-1, and power connector 36-2 visually depicts that the client computer 22-2 is coupled to socket $32\text{-}2_{PD1}$ of the power device 30-1. Power connectors 36-3-36-6 in conjunction with the nodes 26-12-26-15 visually illustrate that the client computer 22-3 is coupled to socket $32\text{-}3_{PD1}$ of the power device 30-1, that the client computer 22-4 is coupled to socket $32\text{-}1_{PD2}$ of the power device 30-2, that the client computer 22-5 is coupled to socket $32\text{-}2_{PD2}$ of the power device 30-2, and that the client computer 22-6 is coupled to socket $32\text{-}3_{PD2}$ of the power device 30-2.

Figure 6:
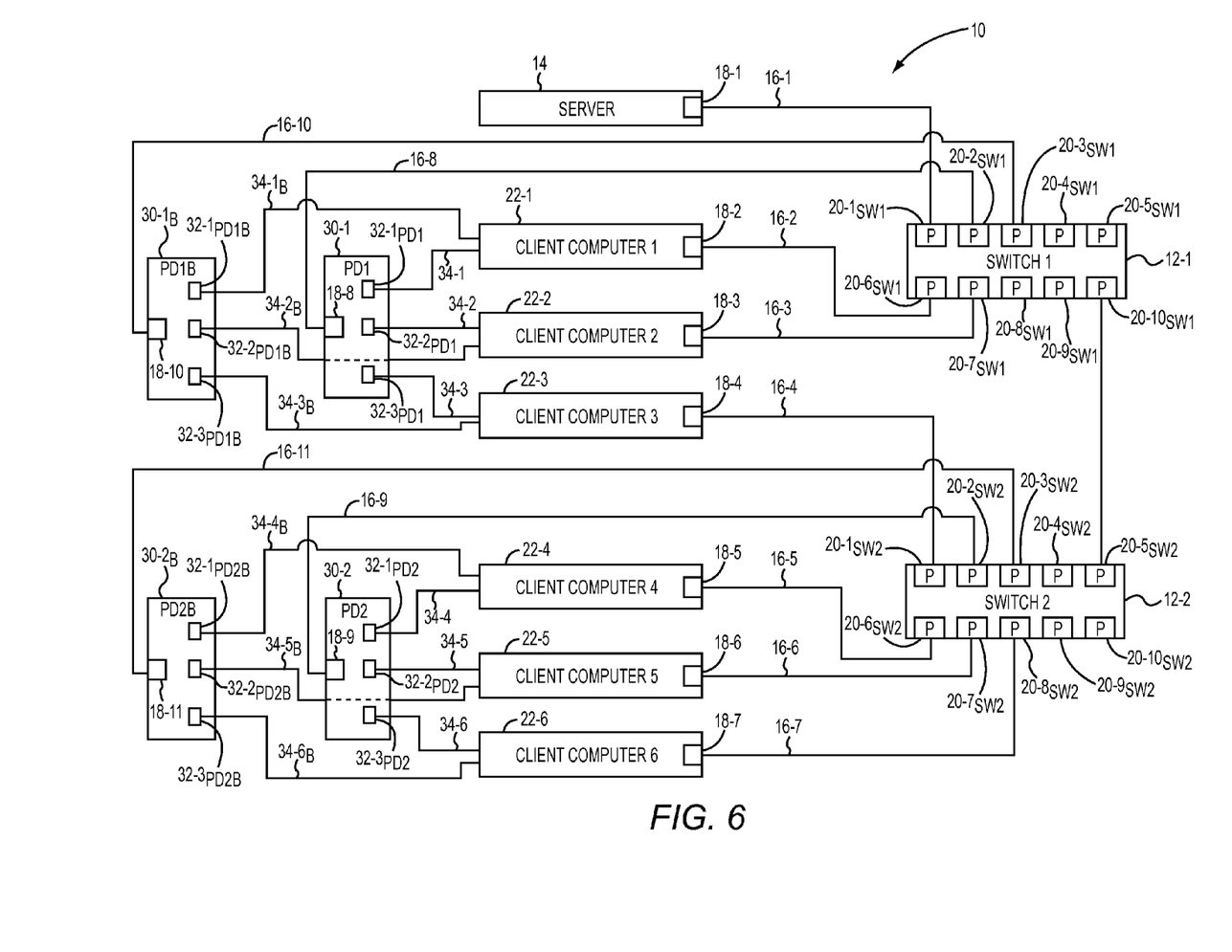
FIG. 6 is a block diagram of the network according to another embodiment.

FIG. 6 is a block diagram of the network 10 according to another embodiment. In this embodiment, the client computers 22 are each powered to multiple power devices 30 for purposes of redundancy, a primary power device 30 and a secondary power device 30. The client computer 22-1 draws power from the socket $32\text{-}1_{PD1}$ via the power link 34-1 and can draw power from a socket $32\text{-}1_{PD1B}$ via a power link $34\text{-}1_B$ in the event the socket $32\text{-}1_{PD1}$ loses the ability to provide power. The client computer 22-2 draws power from the socket $32\text{-}2_{PD1}$ via the power link 34-2 and can draw power from a socket $32\text{-}2_{PD1B}$ via a power link $34\text{-}2_B$ in the event the socket $32\text{-}2_{PD1}$ loses the ability to provide power. The client computer 22-3 draws power from the socket $32\text{-}3_{PD1}$ via the power link 34-3 and can draw power from a socket $32\text{-}3_{PD1B}$ via a power link $34\text{-}3_B$ in the event the socket $32\text{-}3_{PD1}$ loses the ability to provide power. The client computer 22-4 draws power from the socket $32\text{-}1_{PD2}$ via the power link 34-4 and can draw power from a socket $32\text{-}1_{PD2B}$ via a power link $34\text{-}4_B$ in the event the socket $32\text{-}1_{PD2}$ loses the ability to provide power. The client computer 22-5 draws power from the socket $32\text{-}2_{PD2}$ via the power link 34-5 and can draw power from a socket $32\text{-}2_{PD2B}$ via a power link $34\text{-}5_B$ in the event the socket $32\text{-}2_{PD2}$ loses the ability to provide power. The client computer 22-6 draws power from the socket $32\text{-}3_{PD2}$ via the power link 34-6 and can draw power from a socket $32\text{-}3_{PD2B}$ via a power link $34\text{-}6_B$ in the event the socket $32\text{-}3_{PD2}$ loses the ability to provide power.

In this embodiment, similar to that discussed above with regard to FIG. 4, the server 14 determines the existence and network addresses of the power devices 30. In one embodiment, a user, such as a network operator, configures the server 14 with information regarding the power devices 30, including network addresses, such as IP addresses, of the power devices 30. In other embodiments, the server 14 may utilize auto-discovery mechanisms for determining the existence of and addresses of the power devices 30. The network operator may also identify certain power devices 30 as having a paired relationship, such that one or more client computers 22 are each coupled to a pair of sockets 32 that are associated with the paired power devices 30. This information may be maintained, for example, in a configuration table maintained by the server 14.

The server 14 determines for a client computer 22 which sockets 32 of the paired power devices 30 are coupled to the client computer 22. For example, with respect to the client computer 22-1, the server 14 determines that the power devices 30-1 and $30\text{-}1_B$ are paired, and that the client computer 22-1 is coupled to the sockets $32\text{-}1_{PD1}$ and $32\text{-}1_{PD1B}$. This determination may also be based on information contained in a configuration table or may be based on a convention used by an operator of the network 10.

The server 14 sends messages to both of the power devices 30-1 and $30\text{-}1_B$. The message sent to the power device 30-1 directs the power device 30-1 to halt power to the socket $32\text{-}1_{PD1}$, and the message sent to the power device 30-2 directs the power device 30-2 to halt power to the socket $32\text{-}1_{PD2}$. The server 14 then determines that the client computer 22-1 is not capable of communicating, and identifies the client computer 22-1 as being coupled to the sockets $32\text{-}1_{PD1}$ and $32\text{-}1_{PD1B}$.

Figure 7:
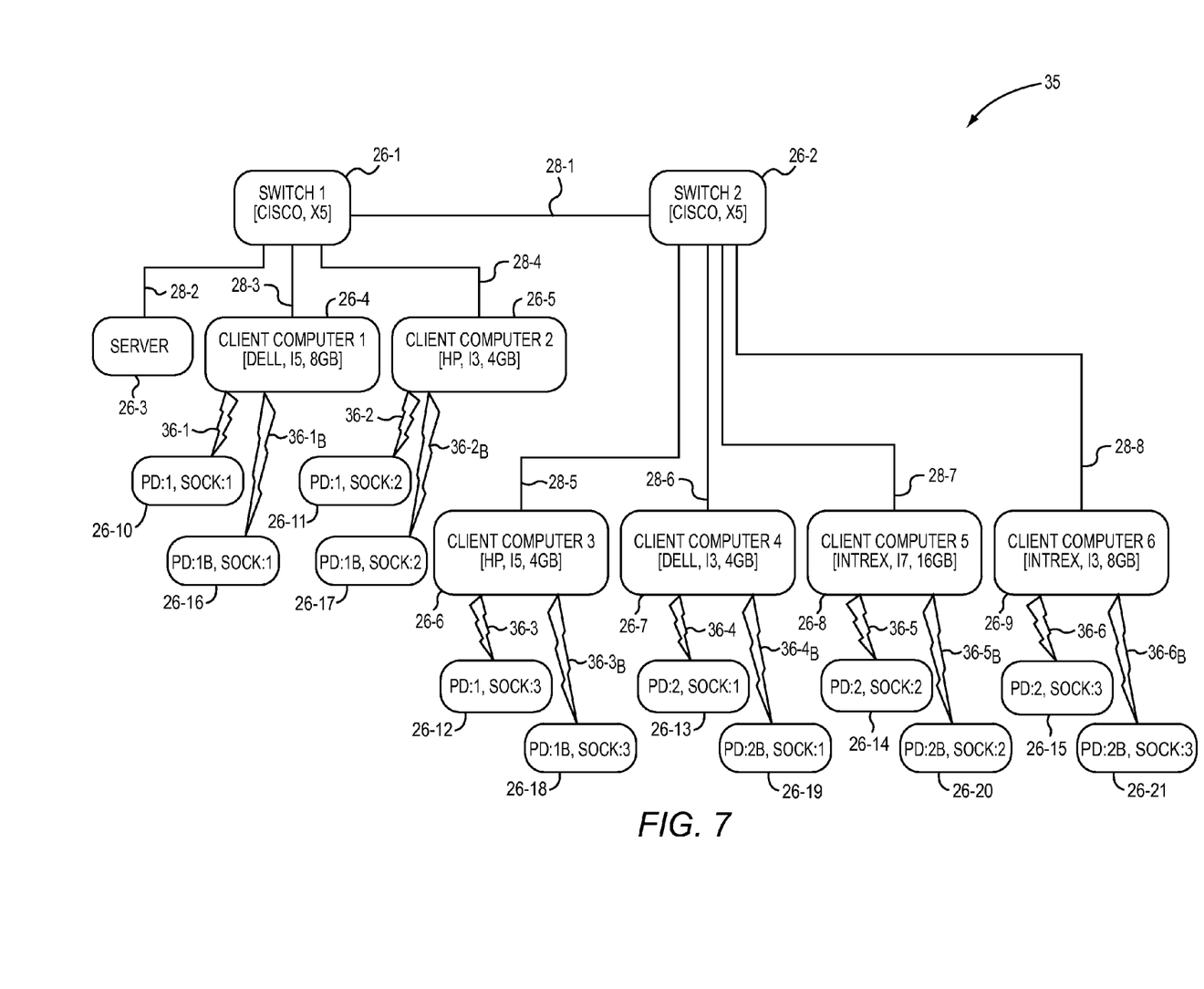
FIG. 7 is a block diagram of a visual representation of a nodal tree structure according to one embodiment.

FIG. 7 is a block diagram of a visual representation 38 of a nodal tree structure according to one embodiment. The visual representation 38 illustrates the communication links 16 between the switch devices 12, the client computers 22, the server 14, and the backup powered arrangement of the power devices 30 with respect to the client computers 22. Thus, each client computer 22 is illustrated as having power provided by two different sockets 32, as illustrated by the nodes 26-4-26-9, which represent the client computers 22-1-22-6, respectively, in conjunction with the nodes 26-10-26-21, which represent sockets 32 of the power devices 30, and the power connectors 36-1-36-6$_B$, each of which represents a power link between a respective client computer 22 and a socket 32 of a power device 30.

Figure 8:
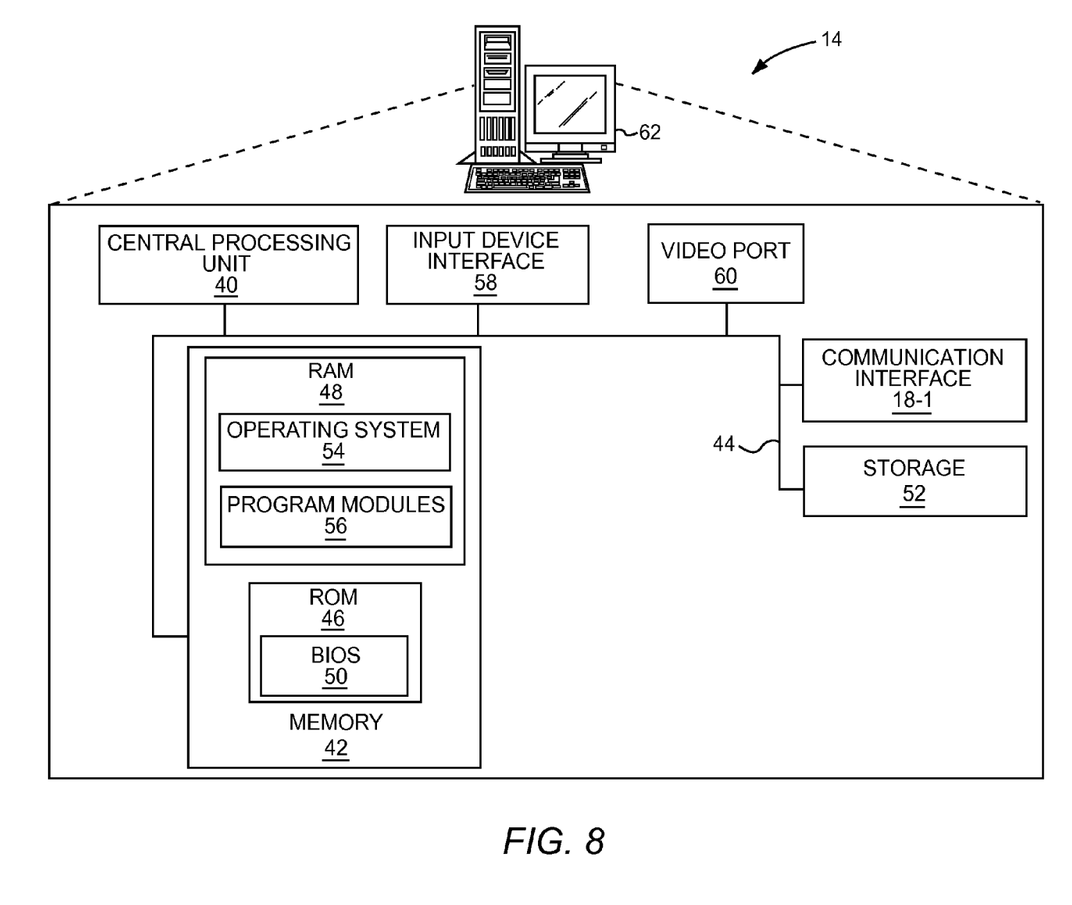
FIG. 8 is a block diagram of a server according to one embodiment.

FIG. 8 is a block diagram of the server 14 according to one embodiment. The server 14 may comprise any computing or processing device capable of including firmware, hardware, and/or executing software instructions to implement the functionality described herein, such as a desktop computer, laptop computer, workstation, network server, or the like. The server 14 includes a central processing unit 40, a system memory 42, and a system bus 44. The system bus 44 provides an interface for system components including, but not limited to, the system memory 42 and the central processing unit 40. The central processing unit 40 can be any commercially available or proprietary processor.

The system bus 44 may be any of several types of bus structures that may further interconnect to a memory bus (with or without a memory controller), a peripheral bus, and/or a local bus using any of a variety of commercially available bus architectures. The system memory 42 may include non-volatile memory 46 (e.g., read only memory (ROM), erasable programmable read only memory (EPROM), electrically erasable programmable read only memory (EEPROM), etc.) and/or volatile memory 48 (e.g., random access memory (RAM)). A basic input/output system (BIOS) 50 may be stored in the non-volatile memory 46, and can include the basic routines that help to transfer information between elements within the server 14. The volatile memory 48 may also include a high-speed RAM, such as static RAM for caching data.

The server 14 may further include or be coupled to a computer-readable storage 52, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The computer-readable storage 52 and other drives, associated with computer-readable media and computer-usable media, may provide non-volatile storage of data, data structures, computer-executable instructions, and the like. Although the description of computer-readable media above refers to an HDD, it should be appreciated by those skilled in the art that other types of media which are readable by a computer, such as Zip disks, magnetic cassettes, flash memory cards, cartridges, and the like, may also be used in the operating environment, and further, that any such media may contain computer-executable instructions for performing novel methods of the disclosed architecture.

A number of modules can be stored in the computer-readable storage 52 and in the volatile memory 48, including an operating system 54 and one or more program modules 56, which may implement the functionality described herein in whole or in part. It is to be appreciated that the embodiments can be implemented with various commercially available operating systems 54 or combinations of operating systems 54.

All or a portion of the embodiments may be implemented as a computer program product stored on a transitory or non-transitory computer-usable or computer-readable storage medium, such as the computer-readable storage 52, which includes complex programming instructions, such as complex computer-readable program code, configured to cause the central processing unit 40 to carry out the steps described herein. Thus, the computer-readable program code can comprise software instructions for implementing the functionality of the embodiments described herein when executed on the central processing unit 40. The central processing unit 40, in conjunction with the program modules 56 in the volatile memory 48, may serve as a controller for the server 14 that is configured to, or adapted to, implement the functionality described herein.

A user, such as a network operator, may be able to enter commands through a keyboard (not illustrated), a pointing device such as a mouse (not illustrated), or a touch-sensitive surface (not illustrated). Such input devices may be connected to the central processing unit 40 through an input device interface 58 that is coupled to the system bus 44, but can be connected by other interfaces such as a parallel port, an Institute of Electrical and Electronic Engineers (IEEE) 1394 serial port, a Universal Serial Bus (USB) port, an infrared (IR) interface, and the like.

The server 14 may also include the communication interface 18-1, suitable for communicating with the switch device 12-1. The server 14 may also include a video port 60 configured to interface with a display 62.

Those skilled in the art will recognize improvements and modifications to the preferred embodiments of the disclosure. All such improvements and modifications are considered within the scope of the concepts disclosed herein and the claims that follow.

What is claimed is:

1. A method for determining a network topology, comprising:
   receiving, by a server comprising a processor, from a plurality of client computers during a boot process of the client computers corresponding requests for a service;
   in response to the requests, providing access to a respective boot image to each client computer, each respective boot image comprising a discovery module configured to execute on the client computer to which access to the respective boot image is provided;
   receiving client computer information messages from the plurality of client computers, the client computer information messages including a network identifier that identifies a media access control (MAC) address of a respective client computer;
   receiving, from a first switch device, a first link table that identifies ports of the first switch device and corresponding network identifiers of at least some client computers of the plurality of client computers;
   receiving, from a second switch device, a second link table that identifies ports of the second switch device and corresponding network identifiers of other client computers of the plurality of client computers;
   sending, to a first power device, a message directing the first power device to halt power to a first socket of the first power device;
   determining that one of the plurality of client computers is not capable of communicating with the server;
   identifying the one of the plurality of client computers as being coupled to the first socket of the first power device; and
   generating a nodal tree structure that identifies the plurality of client computers, physical communication links between the plurality of client computers, the first switch device, and the second switch device based on the client computer information messages, the first link table, and the second link table.

2. The method of claim 1, further comprising:
prior to receiving the client computer information messages, sending, by the server, a message to each client computer that requests the client computer to return a client computer information message that includes the network identifier that identifies the MAC address of the respective client computer.

3. The method of claim 1, further comprising:
sending, to the first power device, a message directing the first power device to initiate power to the first socket of the first power device; and
determining that the one of the plurality of client computers is capable of communicating with the server.

4. The method of claim 1, wherein determining that the one of the plurality of client computers is not capable of communicating with the server comprises:
attempting to communicate with each client computer of the plurality of client computers; and
determining that the one of the plurality of client computers is the only computer of the plurality of client computers that is not capable of communicating with the server.

5. The method of claim 1, further comprising:
for each respective power device of a plurality of power devices, including the first power device:
sending the respective power device a message directing the respective power device to halt power to a first socket of the respective power device;
determining that one of the plurality of client computers is not capable of communicating with the server; and
identifying the one of the plurality of client computers as being coupled to the first socket of the respective power device.

6. The method of claim 5, wherein at least some of the power devices comprise multiple sockets, further comprising:
for each respective socket of each respective power device of the at least some of the power devices:
sending the respective power device a message directing the respective power device to halt power to the respective socket of the respective power device;
determining that one of the plurality of client computers is not capable of communicating with the server; and
identifying the one of the plurality of client computers as being coupled to the respective socket of the respective power device.

7. The method of claim 1, wherein the client computer information messages further comprise one or more of: a video card identifier identifying a type of video card installed in the respective client computer, a memory value identifying an amount of memory in the respective client computer, and a processor identifier identifying a model of processor in the respective client computer.

8. The method of claim 1, further comprising:
determining that each client computer of the plurality of client computers is coupled to a pair of sockets, each socket in the pair of sockets being associated with a different power device of a pair of power devices of a plurality of paired power devices;
sending, to each power device in a pair of power devices, a message directing the power device to halt power to a first socket of a plurality of sockets of the power device;
determining that one of the plurality of client computers is not capable of communicating with the server; and
identifying the one of the plurality of client computers as being coupled to the pair of power devices of the plurality of paired power devices.

9. The method of claim 1, further comprising:
receiving, from the first switch device, a neighbor switch table that identifies at least one port of the first switch device and the second switch device; and
wherein generating the nodal tree structure further comprises generating the nodal tree structure based on the client computer information messages, the first link table, the second link table, and the neighbor switch table.

10. The method of claim 1, further comprising:
receiving, from each client computer of the plurality of client computers, a registration message that indicates the respective client computer has received the respective boot image and loaded the discovery module; and
storing data identifying the respective client computer as a registered client computer.

11. A server, comprising:
a communication interface configured to communicate with a plurality of client computers; and
a processor coupled to the communication interface, and configured to:
receive, from the plurality of client computers during a boot process of the client computers, a plurality of requests for a service;
provide access to a respective boot image to each client computer, each respective boot image comprising a discovery module configured to execute on the client computer to which the access to the respective boot image is provided;
receive client computer information messages from the plurality of client computers, the client computer information messages each including a network identifier that identifies a media access control (MAC) address of a respective client computer;
receive, from a first switch device, a first link table that identifies ports of the first switch device and corresponding network identifiers of at least some client computers of the plurality of client computers;
receive, from a second switch device, a second link table that identifies ports of the second switch device and corresponding network identifiers of other client computers of the plurality of client computers;
send, to a first power device, a message directing the first power device to halt power to a first socket of the first power device;
determine that one of the plurality of client computers is not capable of communicating with the server;
identify the one of the plurality of client computers as being coupled to the first socket of the first power device; and
generate a nodal tree structure that identifies the plurality of client computers, physical communication links between the plurality of client computers, the first switch device, and the second switch device based on the client computer information messages, the first link table, and the second link table.

12. The server of claim 11, wherein the processor is further configured to:
send, to the first power device, a message directing the first power device to initiate power to the first socket of the first power device; and determine that the one of the plurality of client computers is capable of communicating with the server.

13. The server of claim 11, wherein to determine that the one of the plurality of client computers is not capable of communicating with the server, the processor is further configured to:
    attempt to communicate with each client computer of the plurality of client computers; and
    determine that the one of the plurality of client computers is the only client computer of the plurality of client computers that is not capable of communicating with the server.

14. The server of claim 11, wherein the processor is further configured to:
    receive, from the first switch device, a neighbor switch table that identifies at least one port of the first switch device and the second switch device; and
    wherein to generate the nodal tree structure the processor is further configured to generate the nodal tree structure based on the client computer information messages, the first link table, the second link table, and the neighbor switch table.

15. A computer program product for obtaining information about a network, the computer program product stored on a non-transitory computer-readable storage medium and including instructions configured to cause a processor to carry out the steps of:
    receiving, from a plurality of client computers during a boot process of the client computers, a plurality of requests for a service;
    in response to the requests, providing access to a respective boot image to each client computer, each respective boot image comprising a discovery module configured to execute on the client computer to which the access to the respective boot image is provided;
    receiving client computer information messages from the plurality of client computers, the client computer information messages including a network identifier that identifies a media access control (MAC) address of a respective client computer;
    receiving, from a first switch device, a first link table that identifies ports of the first switch device and corresponding network identifiers of at least some client computers of the plurality of client computers;
    receiving, from a second switch device, a second link table that identifies ports of the second switch device and corresponding network identifiers of other client computers of the plurality of client computers;
    sending, to a first power device, a message directing the first power device to halt power to a first socket of the first power device;
    determining that one of the plurality of client computers is not capable of communicating with the server;
    identifying the one of the plurality of client computers as being coupled to the first socket of the first power device; and
    generating a nodal tree structure that identifies the plurality of client computers, physical communication links between the plurality of client computers, the first switch device, and the second switch device based on the client computer information messages, the first link table, and the second link table.

16. The method of claim 1 further comprising:
    sending, by the server to the first switch device, a simple network management protocol (SNMP) message that requests the first link table.

* * * * *